J. S. NORTH.
HOSE SUPPORTER PAD.
APPLICATION FILED APR. 13, 1918.
1,278,727.
Patented Sept. 10, 1918.
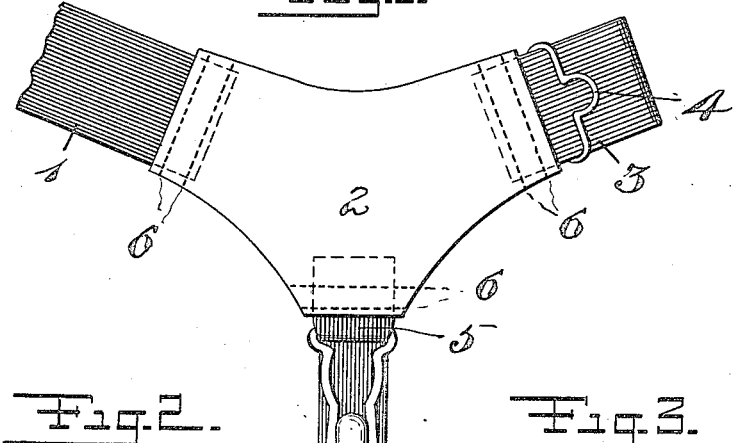
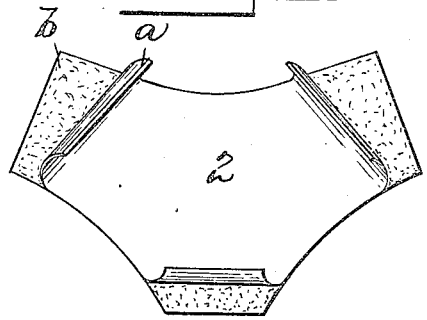
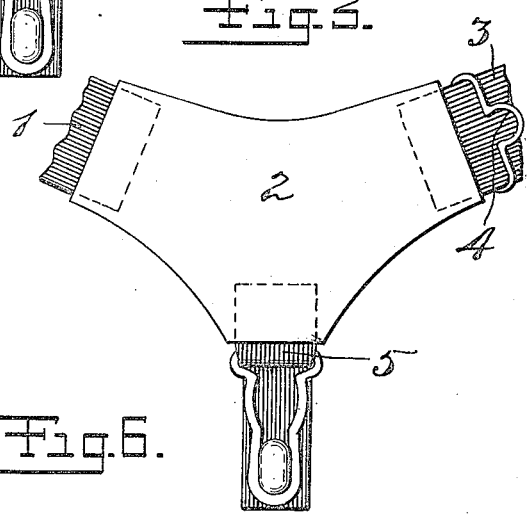
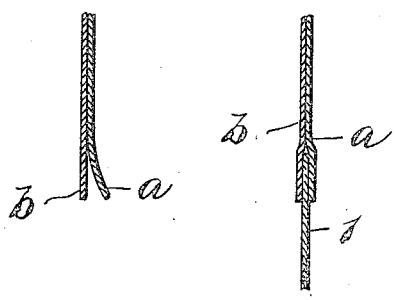
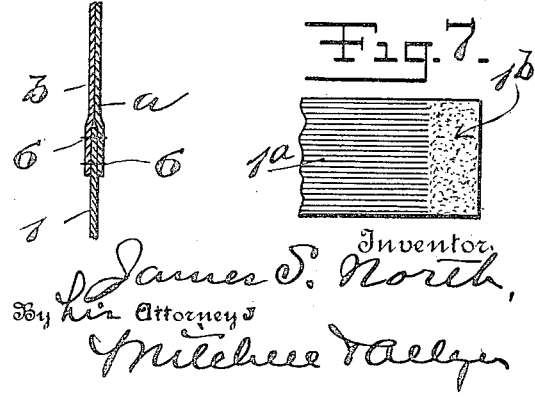
Inventor,
James S. North,
By his Attorneys

UNITED STATES PATENT OFFICE.

JAMES S. NORTH, OF NEW BRITAIN, CONNECTICUT, ASSIGNOR TO THE C. J. WHITE MFG. CO., OF NEW BRITAIN, CONNECTICUT, A CORPORATION OF CONNECTICUT.

HOSE-SUPPORTER PAD.

1,278,727.                    Specification of Letters Patent.      Patented Sept. 10, 1918.

Application filed April 13, 1918.   Serial No. 228,330.

*To all whom it may concern:*

Be it known that I, JAMES S. NORTH, a citizen of the United States of America, residing at New Britain, Connecticut, have invented a new and useful Hose-Supporter Pad, of which the following is a specification.

My invention relates particularly to improvements in what are termed pad hose-supporters, and my object is to provide a superior construction which may be rapidly and economically produced and which in its finished state will be strong and durable.

In the accompanying drawings:

Figure 1 is a front view of the main part of a pad hose supporter illustrating my invention in its preferred form.

Fig. 2 is a view of the pad before the connecting ends are assembled therewith.

Fig. 3 is a view similar to Fig. 1 but before any stitches have been applied.

Fig. 4 is a sectional view of part of the pad with one corner open ready to receive one of the connecting ends.

Fig. 5 is a similar view showing the connecting end in place ready to receive the stitching.

Fig. 6 is a similar view illustrating the same parts with the stitching in place.

Fig. 7 is a view of a modified detail.

I have shown my invention in its preferred form as applied to a man's hose supporter of the pad type. 1 represents the usual elastic strip which goes around the leg and which is fastened permanently to one upper corner of the pad. The free end of said strip is provided with a suitable fastening device (not shown) whereby it may be detachably connected to the opposite upper corner of the pad 2. 3 represents a short tab preferably provided at the last mentioned corner of the pad and arranged to carry the usual fastening member 4 for the fastener at the free end of the strip 1. 5 represents a short tab secured to the lower edge of the pad and in turn supporting a suitable fastener to be engaged with the stocking. In this particular instance, this latter fastener is of the "button and loop" type, although of course, this is not material.

The pad itself is preferably of triangular form with the corners squared off and is made of at least two layers of fabric indicated at *a, b*, which plies are suitably secured together by means of an appropriate intervening adhesive substance. Preferably, each ply of the fabric has a backing of some adhesive compound so that when the two plies are brought together they will become permanently united.

The ends of strip 1 and tabs 3 and 5 (which I will term connecting ends), should preferably be inserted between the plies of the pad so that when the same are brought together, the said strip and tabs will be held in their final position. When the layers of fabric forming the pad are pressed into engagement with the ends of said connecting members, the adhesive will serve to hold the connecting members in place. Thereafter one or more rows of stitches 6—6 may be taken through the fabric layers of the pad and the inclosed ends of the connecting members to permanently fasten the strip and tabs in place and so as to secure the corners of the pad plies whereby they will not roll up.

In some instances, if desirable, the ends of the connecting members 1, 3 and 5 to be placed between the pad plies may receive a preliminary treatment of some material which will assist in making an effective union between the said ends and the overlying layers of the fabric constituting the pad and without the use of stitches, but I prefer, however, to use stitches as I find it economical and highly effective. Another substantial advantage of the present construction is that when the strip and tab ends are placed between the layers of fabric, they are held with sufficient firmness so that they will not be displaced during the stitching operation. Ordinarily in hose supporters of this type, the pads are stitched entirely around the border and close thereto, the edges being tucked in with great care so as to provide a proper finish. It requires much practice to acquire the necessary skill to do this work, and at the best, it is slow and expensive hand work.

By my improvement, the cost of manufacture is very substantially reduced in this respect inasmuch as no particular skill is required on the part of the operative and the amount of stitching necessary to produce a strong and serviceable article is very materially reduced.

It should be further understood, that any suitable fabric may be employed for the layers of the pad, the outer layers of different pads ordinarily varying in color and quality to suit the particular wishes of the consumer. In this respect the widest latitude is permissible.

While I prefer to employ a fabric which has had suitable preliminary adhesive treatment on one surface, since it simplifies and expedites the work of assembling the hose supporter, it is not essential that the adhesive should be actually applied to the surface preparatory to the assembling act, the important thing being that some suitable adhesive be employed in some suitable way to secure the various parts together preparatory to the stitching and finishing operations.

Economy may be effected by having the plies of fabric which constitute the pad cut of an appropriate shape at the outset, although of course the edges of the pad may be trimmed even after the parts are assembled and without necessarily injuring the finished article, which of course is impossible in the ordinary pad hose supporter as now constructed with stitches close to said edge.

A pad thus constructed while sufficiently flexible to conform to the leg possesses a much desirable firmness which makes the attachment of the same easy and guarantees a good fit.

In the modification shown in Fig. 7, $1^a$ represents the end of one of the connecting ends, in this instance, the elastic strip. $1^b$ indicates an adhesive substance deposited upon or applied to the tip of said connecting end so that when the end is inserted in place between the plies of the pad, it will adhere thereto whether or not there has been any adhesive material deposited on said plies. By treating each connecting end in this manner, it furnishes another way of holding the insertions in place preparatory to stitching and would thus materially assist in the manufacture of the article even if it were of the type wherein the pad is stitched entirely around its edges.

What I claim is:

1. In a pad hose supporter, a pad composed of a plurality of plies of fabric, connecting ends associated therewith and projecting from the same at different points and in different directions, said connecting ends extending between the plies constituting the pad, and an adhesive material serving to secure said plies and connecting ends together.

2. In a pad hose supporter, a pad composed of a plurality of plies of fabric, connecting ends associated therewith and projecting from the same at different points and in different directions, said connecting ends extending between the plies constituting the pad, and an adhesive material serving to secure said plies and connecting ends together with stitches extending through the plies of the pad and through the connecting ends to furnish added security.

3. In a pad hose supporter, a pad composed of a plurality of plies of fabric, connecting ends associated therewith and projecting from the same at different points and in different directions, said connecting ends extending between the plies constituting the pad, and an adhesive material serving to secure said plies together with stitches extending through the plies of the pad and through the connecting ends to furnish added security, the adhesive being located not only between the plies of the pad but also between said plies and said ends.

4. In a pad hose supporter, a pad composed of a plurality of plies of fabric, connecting ends inserted therebetween and projecting from the pad in different directions with adhesive material between said plies and the inserted portions of said connecting ends, and stitches serving to unite said plies and said connecting ends.

5. In a pad hose supporter, a pad composed of a plurality of plies of fabric, connecting ends inserted therebetween and projecting from the pad in different directions with adhesive material between said plies and the inserted portions of said connecting ends, and stitches serving to unite said plies and said connecting ends, said adhesive material being deposited on said connecting ends.

6. In a pad hose supporter, a pad composed of a plurality of plies of fabric, connecting ends inserted therebetween and projecting therefrom in different directions, adhesive material serving to secure together said plies and said connecting ends, and stitches serving to further secure together said plies and said connecting ends.

JAMES S. NORTH.

Copies of this patent may be obtained for five cents each, by addressing the "Commissioner of Patents, Washington, D. C."